United States Patent [19]

Parman et al.

[11] 4,334,171
[45] Jun. 8, 1982

[54] LIGHT DIMMER SWITCH HAVING REMOTE LOAD CURRENT SWITCHING

[75] Inventors: Dan F. Parman; LeMoey M. Wiebush, both of San Antonio; Fred M. Shaw, Universal City; James P. Cummins, San Antonio, all of Tex.

[73] Assignee: Power Controls Corporation, San Antonio, Tex.

[21] Appl. No.: 166,057

[22] Filed: Jul. 7, 1980

Related U.S. Application Data

[63] Continuation-in-part of Ser. No. 942,191, Sep. 14, 1978, abandoned.

[51] Int. Cl.$^3$ .............................................. G05F 1/00
[52] U.S. Cl. .................................... 315/199; 315/291; 315/DIG. 4; 323/905
[58] Field of Search ................. 315/291, DIG. 4, 199, 315/194; 307/303, 310; 361/386, 388; 323/905

[56] References Cited

U.S. PATENT DOCUMENTS

| | | | |
|---|---|---|---|
| 3,058,020 | 10/1962 | Balan | 323/905 |
| 3,103,618 | 12/1966 | Slater | 315/DIG. 4 |
| 3,200,296 | 8/1965 | Bruestle | 361/388 |
| 3,573,543 | 4/1971 | Grindstaff | 323/905 |
| 3,798,506 | 3/1974 | English | 361/386 |
| 3,801,874 | 4/1974 | Stefani | 361/388 |
| 3,846,824 | 11/1974 | Bell | 361/386 |
| 4,259,619 | 3/1981 | Wall | 315/199 |

*Primary Examiner*—Harold A. Dixon
*Attorney, Agent, or Firm*—Gunn, Lee & Jackson

[57] ABSTRACT

A light dimmer switch is shown that appears as an ordinary snap switch, but will handle high wattage loads. A controller unit is mounted in a switch box and a remote unit which includes a load switching triac is remotely mounted on a heat sink. Current flowing through the triac to the load is varied by the controller unit. Filtering networks and/or shielding reduce radiated noise along lead lines between the remote unit and the controller unit, plus the filtering prevents noise from being conducted internally along the lead lines. Heat conducted along the lead lines from the remote unit is reduced to more than acceptable levels by connecting the lead lines through a terminal to a thin electrically insulating, thermally conductive strip. In turn, the insulating strip is fixed to the heat sink to transmit heat received from the lead lines to the heat sink.

4 Claims, 4 Drawing Figures

LIGHT DIMMER SWITCH HAVING REMOTE LOAD CURRENT SWITCHING

The present application is a continuation-in-part of U.S. patent application Ser. No. 942,191 filed Sept. 14, 1978 now abandoned having the same title and assignee as the present application. Also, the present application is an improvement over U.S. Pat. Nos. 3,990,033 and 4,085,399, and U.S. patent application Ser. No. 797,528 filed on May 6, 1977, now U.S. Pat. No. 4,259,619 all of which have the same assignee as the present application.

BACKGROUND OF THE INVENTION

This invention relates to a light dimmer switch for high wattage loads and, more particularly, to a light dimmer switch having a controller unit that appears as a snap switch and a remote unit for handling the load current switching function.

DESCRIPTION OF THE PRIOR ART

Prior to the present invention, many different types of light dimming switches have been designed, proposed and/or marketed. Light dimmers that appear externally to be the same as a snap switch have been patented in the past with the above referenced patents and application being typical examples. However, in all of the prior versions known to applicants, all switches that appear to be the same as an ordinary snap switch are for low wattage power demands. Underwriters Laboratory, Inc. uses a standard of 600 watts as the maximum rating for typical wall mounted snap switches and dimmers. In special circumstances with extra heat sink capabilities, it may be possible to extend the maximum wattage rating of dimmers up to 2,000 watts and still pass UL tests.

With the design of the present switch, the heat sink and the load current switching device are removed to a remote location so that the switch continues to appear to be an ordinary snap switch. By the use of a remote unit as explained hereinafter, loads up to 3,000 watts are easily handled. The most common switching device used in light dimming circuits is a triac because of the possible savings in power. However, due to load current switching, the triac has some power loss that must be dissipated by any convenient means, such as a heat sink.

In the aforementioned U.S. Pat. No. 4,085,399, a typical dimmer circuit is shown in FIG. 10 with a triac being used to vary the amount of current flowing through the load. Many other circuits using triac switching have been designed and used in the past. However, a handle wattages up to 3,000 watts, a larger triac and an additional heat sink is required. Presently, light dimmer switches that have a capability to handle higher wattage loads between 1,000 to 2,000 watts require large heat sinks mounted on the face of the wall at the switch box. Depending upon the load current, the large heat sinks may get very hot during normal switching with the resultant failure to pass standard Underwriters Laboratory's test. One of the tests required by Underwriters Laboratory is that the leads or service terminals into the switch have no more than a 30° Centigrade temperature rise above ambient.

By having the switching device, namely, the triac, located away from the remaining circuit contained in the wall switch box, long interconnecting leads over which power is switched are required. The leads tend to act as antennas and as conductors that radiate and conduct RFI noise which interferes with the operation of standard household items, such as radios, stereos, or televisions. Therefore, in the past the triac switching device has been located in the same housing with the control portion of the circuit thereby reducing radiated RFI noise. By keeping the triac in one housing with the control portion of the circuit, the maximum temperature rise as established in Underwriters Laboratory tests becomes difficult or impossible to meet for high voltage loads. Therefore, in the past, either the temperature rise in the light dimmer switches would cause a failure to pass Underwriters Laboratory tests, or the entire control circuit would be moved to a remote location with the switching element. The prior art does not show the removal of only the load current switching element to a remote location with suitable reduction in RFI noise, plus meeting the requirement of temperature of all leads not exceeding 30° Centigrade above ambient.

SUMMARY OF THE INVENTION

It is an object of the present invention to provide a high wattage light dimmer switch that appears the same as an ordinary snap switch.

The present invention uses a control unit located in the switch box and a remote unit with a load current switching element, such as the triac, remotely located on a heat sink some distance away from the switch box. The control unit located in the switch box is connected to the remote unit through appropriate lead lines. The triac is mounted on a suitable size heat sink to dissipate the power losses during load current switching. To eliminate RFI noise from being radiated from or conducted along the leads connecting the control unit and the remote unit, RFI filtering is connected at each end of at least the load current leads. Suppression of the RFI noise is necessary to prevent interference with other electrical products. Concerning the gate lead to the triac, either filtering or shielding may be used if desired; however, it has been found in most circumstances that neither filtering nor shielding is necessary for the gate.

Variable power may be supplied to any load, such as lights, over a full cycle of applied AC voltage by using a circuit containing an RC phase control network, a diac and a triac. The RC phase control network uses a double time constant circuit in order to reduce hysteresis effect. While one RC network is sufficient to trigger a diac into conduction, which diac will in turn trigger the load current switching triac into conduction, in case of repeated switching over short time intervals the second switching of the triac may either not occur or occur only after a significant increase in AC voltage well above the desired switching point. In the case of light dimmers, the lights during a second switching after a short time interval will not come on for a low dim, but only come on for nearly full brightness. The first capacitor, which still maintains its charge, resists current flow therethrough for lower portions of the dimming cycle. By adding a second RC network in parallel with the first capacitor, a second capacitor will discharge through the first capacitor during repeated switching over short time intervals, thereby causing sufficient current flow to trigger the diac into conduction. Therefore, the hysteresis effect of a single time constant of a single RC network is substantially reduced.

A mechanical switch is provided at each end of the mechanical movement of an actuation lever to give a full OFF or ON, thereby bypassing the electronic circuitry. This provides a conventionally operated snap switch in case of failure of the electronics.

The remote unit includes a separate heat sink to be located some distance from the switch box at an inconspicuous location. The control unit located in the switch box contains the electronic gating circuitry, mechanical switching and some RFI suppression for control of the remote unit. The control unit may be mounted in a standard single wall switch box or a multiple gain wall switch box. The control unit mounted in the wall switch box dissipates an almost negligible amount of energy in the form of heat when compared to other dimmers. The main source of heat dissipation is in the triac which is mounted in the remote unit where waste heat can be safely and efficiently removed.

To insure leads from the remote unit (the main heat producing unit) do not rise outside of the housing by more than 30° Centigrade above ambient as required by current Underwriters Laboratory testing, the leads connect to terminals which are in direct contact with a thermally conductive strip. The thermally conductive strip consists of a thin, flat piece of electrically insulating yet heat conductive material, such as ceramic. The ceramic strip may be bonded to the heat sink by a thermally conductive heat transfer heat sink joint compound. Placed on top of the terminals to insure the rigidity of the terminals is a piece of cellulose fiber board. To secure the ceramic strip, terminals and fiber board to the heat sink, threaded nylon screws are utilized. The leads from the remote control unit are soldered to the terminals prior to leaving the housing for the remote control unit. Therefore, most of the heat flowing from the triac along the lead lines is conveyed through the terminals and the ceramic strip to the heat sink thereby reducing the heat along the lead lines prior to exiting the housing of the remote unit. There is no problem with excess heat being developed in the control unit to require special precautions as taken in the remote unit because little energy is dissipated in the control unit.

RFI noise suppression for both the control unit and the remote unit have similar characteristics. Each time the triac is triggered, the current through the load goes from zero to the load limited current value in a few microseconds. A considerable amount of RFI noise is generated as a result of the switching of load currents, which noise can be radiated from or conducted along the lead lines between the control unit and the remote unit if suitable supression is not provided. Also, the diac used to gate the triac can create some RFI noise due to the step function characteristics. The switching of the diac and triac, while having very little effect on VHF frequency band or above, can cause severe interference with the AM broadcast bands between 550 and 1600 KHz.

By a suitable filter, which can be an inductor in series with the load current carrying connection to the triac and a shunt capacitor connected across the triac, a reduction in RFI noise can be obtained to prevent most interference with the AM broadcast band. A typical range of values for the capacitor would be between 0.1 to 0.3 microfarads and a typical range of values for the inductor being between 1 to 200 microhenries. Radiation from the leads to the triac can be further reduced by shielding.

DESCRIPTION OF THE PREFERRED EMBODIMENT

Figure 1:
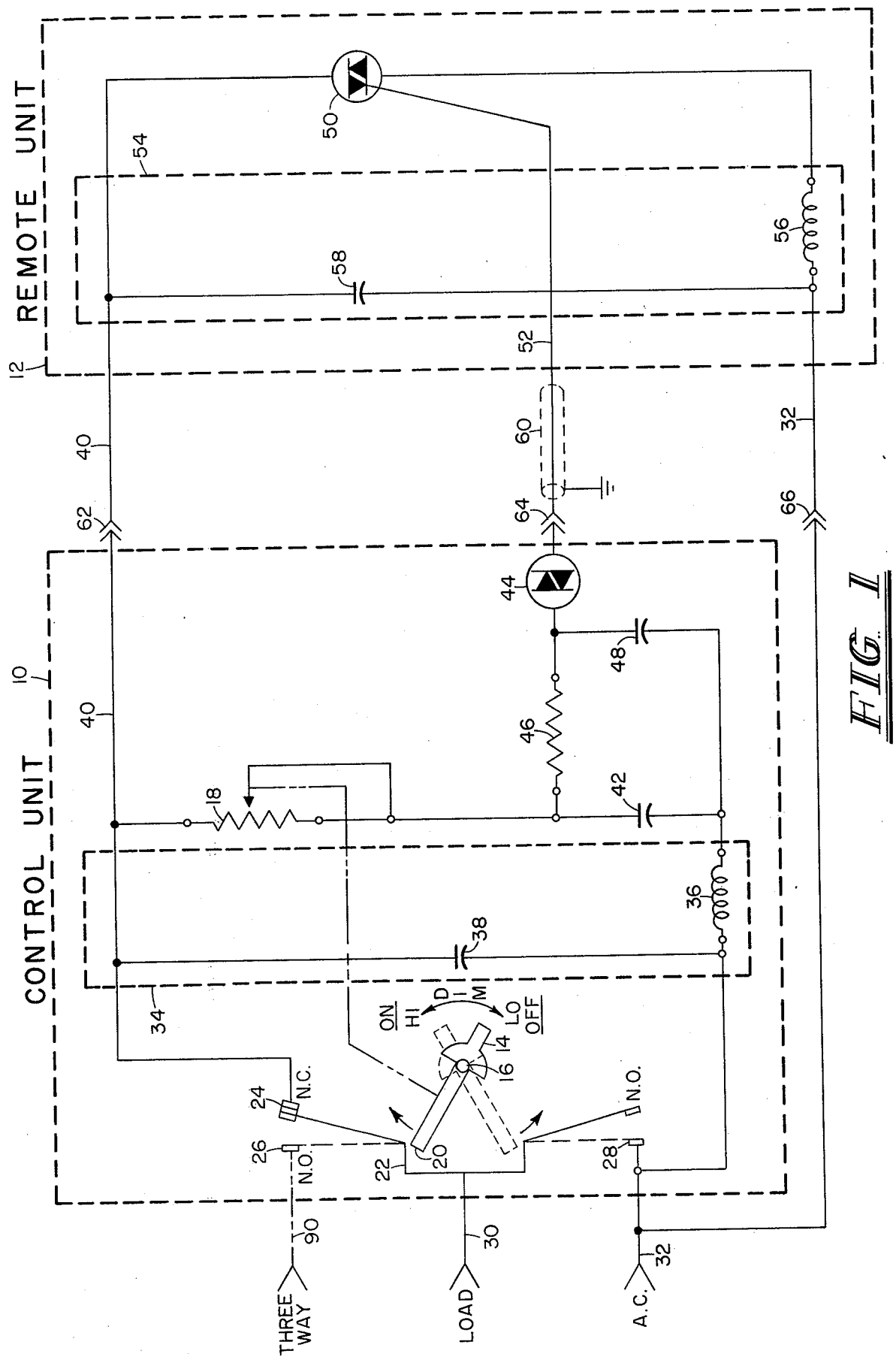
FIG. 1 is a schematic diagram of a light dimmer switch with a control unit and a remote unit.

Referring to FIG. 1 of the drawings, there is shown a detail schematic diagram of a possible control circuit similar to the control circuit used in the above mentioned patents and application, but incorporating the improvements of the present invention. The control unit shall be designated generally by reference numeral 10 and the remote unit designated generally by reference numeral 12. The control unit 10 has an actuator arm pivotally mounted about pivot point 16. Movement of the actuator arm 14 about pivot point 16 along the intermediate positions causes a simultaneous movement of the wiper arm of variable resistor 18. At the lower end of movement of the actuator arm 14, end 20 thereof strikes contactor arm 22 to break the electrical connection with normally closed contact 24 and make an electrical connection with normally open contact 26 as shown in reference lines. Alternatively, when the actuator arm 14 is in the higher end of movement, end 20 will strike the lower portion of the contactor arm 22 thereby making an electrical connection with normally open contact 28 as shown in reference lines.

Lead 30 connects the contactor arm 22 to the standard load, such as lights. Lead 32 connects AC power to normally open contact 28 of the control unit 10 and to the remote unit 12. Also internally within the control unit 10, lead 32 connects to a control unit filter network 34. Inside of the control unit filter network 34, lead 32 connects to inductor 36 and capacitor 38. The opposite side of capacitor 38 connects to normally closed contact 24 via interconnecting lead 40. A typical range of values for the capacitor 38 can be 0.1 to 0.3 microfarads, and a typical range of values for the inductor 36 can be 1 to 200 microhenries. It is important that the control unit filter network 34 suppress undue noise from the gating circuit.

Charge on the capacitor 38 approximately follows the AC input voltage received on lead 30 when the actuator arm 14 is at any position other than the full OFF or ON positions. As the actuator arm 14 moves the wiper arm of variable resistor 18 during upward movement toward the high position, charge on capacitor 42 is increased earlier during each half cycle of AC current due to decreased resistance from variable resistor 18. As the charge on capacitor 42 is increased earlier in each half cycle, the voltage received by diac 44 via resistor 46 and the charge on capacitor 48 is also increased earlier in each half cycle. When the voltage limit, either positive or negative, on diac 44 is exceeded, diac 44 will trigger to allow current flow therethrough, thereby triggering triac 50 in the remote unit 12 into conduction via interconnecting lead 52. By controlling the trigger point of diac 44, the conduction of triac 50 can also be controlled. The RC circuit formed by resistor 46 and capacitor 48 provides a double time constant to reduce hysteresis effect in case of repeated switching by actuator arm 14 over short time intervals as previously explained.

Inside of the remote unit 12 is located a remote unit filter network 54, which in this preferred embodiment includes an inductor 56 in series with the power lead 32. Connected across the power lead 32 and the interconnecting lead 40 is a capacitor 58 forming a part of the remote unit filter network 54. A typical range of values for the capacitor 58 may be between 0.1 microfrads to 0.3 microfarads, and a typical range for the inductor 56 may be between 1 microhenries and 200 microhenries. By use of the remote unit filter network 54 with capacitor 58 being approximately 0.1 microfarad and inductor 56 being approximately 100 microhenries, suppression in the range of 40 to 50 dbs can be obtained thereby allowing the dimmer switch formed from the control unit 10 and remote unit 12 to pass all standard restrictions in existence by the Federal Communications Commission, Department of Defense, American Standard Specifications Institute, and National Electric Manufacturing Association. If additional suppression is necessary to prevent interference with AM broadcast bands, shielding may be used, such as shielding 60, illustrated for the interconnecting lead 52 to the gate of triac 50.

When the actuator arm 14 is in its lowermost position, actuator arm 14 will electrically connect with the normally open contact 26 thereby preventing any current flow through either the control unit 10, remote unit 12, or the load connected by load lead 30. An exception is a three-way switch connection as will be subsequently mentioned. During intermediate positions varying between high and low dim, the actuator arm 14 may be in any of the positions as shown by the arrow in FIG. 1 for the dimming function, thereby allowing appropriate amounts of current to flow through the control unit 10 and remote unit 12 as regulated by the variable resistor 18. In the uppermost position of the actuator arm 14, or the full ON position, contactor arm 22 electrically connects with normally open contact 28 to allow current flow through the power lead 32, contactor arm 22 directly to the load via load lead 30. The full ON position prevents heat buildup and provides conventional operation.

Interconnections between the control unit 10 and remote unit 12 may be provided by connectors 62, 64 and 66 in interconnecting lead 40, interconnecting lead 52, and power lead 32, respectively.

The circuit as described hereinabove may also be used as a three-way light dimmer switch as described in the aforementioned patent application Ser. No. 797,528 filed on May 16, 1977, now U.S. Pat. No. 4,259,619. The only interval change would be to add three-way lead 90 and normally open contact 26, three-way lead 90 being shown in reference lines.

Figure 2:
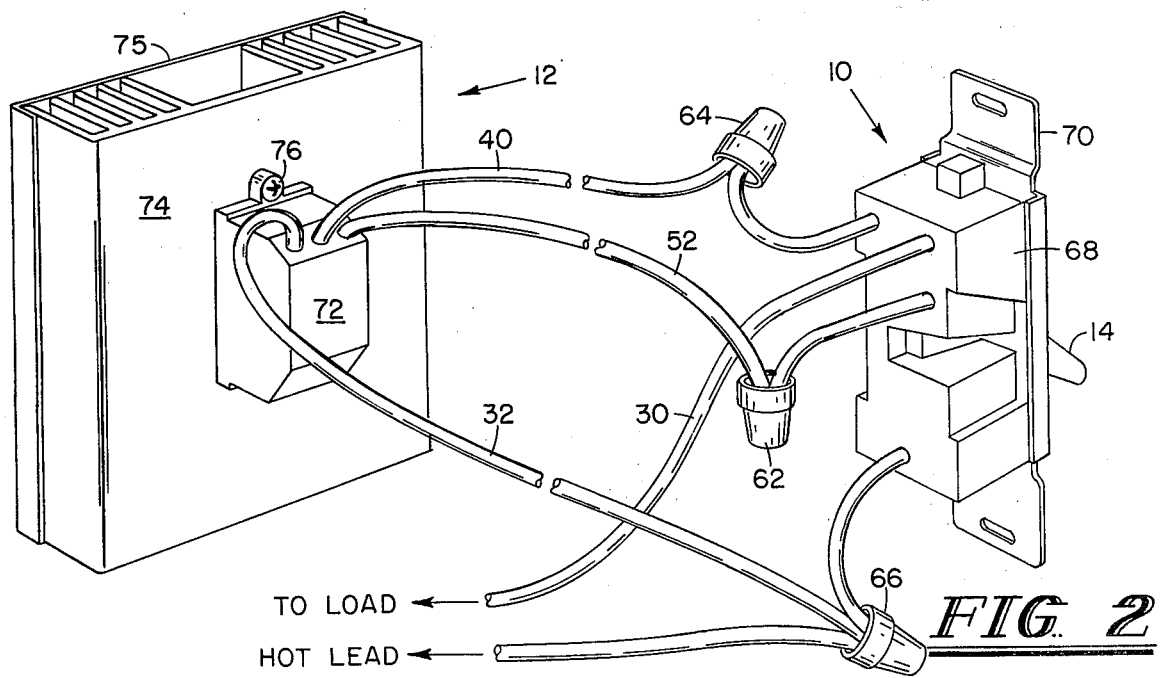
FIG. 2 is a pictorial representation of interconnections between the control unit and remote unit with household wiring.

Referring now to FIG. 2 of the drawings, the control unit 10 and remote unit 12 are pictorially illustrated with their connections to household wiring as previously described in conjunction with FIG. 1. The control unit 10 has a housing 68 connected to a mounting strap 70. The remote unit 12 has its electronic components contained inside of housing 72 attached to heat sink 74 by means of bolts 76 connected through holes 77 (see FIG. 3). Heat sink 74 has a protective cover 75 on the side opposite housing 72.

Figure 3:
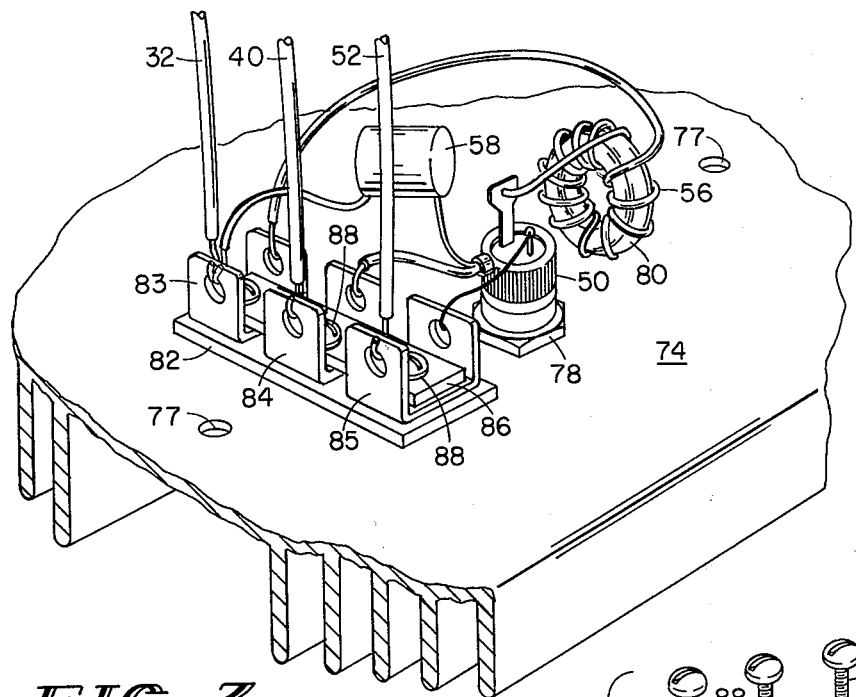
FIG. 3 is a partial perspective view of the remote unit with the housing removed.
Figure 4:
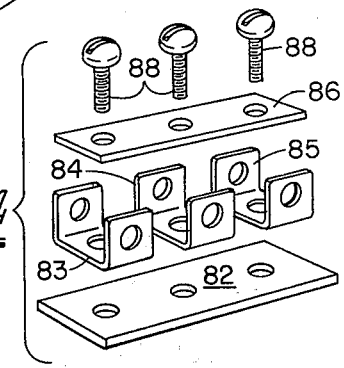
FIG. 4 is an exploded view of the terminal mounting assembly in FIG. 3.

Referring now to FIGS. 3 and 4 in conjunction with FIGS. 1 and 2, a better understanding of the remote unit 12 can be obtained. In FIGS. 3 and 4, the housing 72 and protective cover 75 for the remote unit 12 has been removed to illustrate the physical arrangement of the electrical contents. The triac 50 is mounted on the heat sink 74 and secured thereto by means of nut 78 to transfer heat from the triac 50 to the heat sink 74. The inductor 56 and capacitor 58 are connected to the triac 50 as electrically shown in FIG. 1 and pictorially shown in FIGS. 3 and 4. The inductor 56 may be located in any of a number of positions to prevent undue radiation of heat between the triac 50 and the inductor 56. The inductor 56 is wound about a suitable core material 80 to obtain the desired reactance for noise suppression.

A thin, electrically insulative strip 82 is affixed to the heat sink 74 inside of the housing 72 by thermally conductive heat sink joint compound, such as "Thermalcote" from Thermalloy, Inc. The thin, electrically insulative strip 82 may be made from any suitable material, such as ceramic, a preferred ceramic being 96% alumina; however, it is important that the strip 82 be electrically insulative, yet be thermally conductive. Positioned on the ceramic strip 82 are three separate terminals 83, 84 and 85. Cellulose fiber board 86 fits on top of terminals 84 to maintain terminals 83, 84 and 85 in a rigid configuration. Flame retardant coated nylon screws 88 secure the assembly of fiber board 86, terminals 83, 84 and 85, and ceramic strip 82 to heat sink 74. The leads 32, 40 and 52 are soldered to one side of their respective terminals 83, 84 and 85. From opposite sides on the terminals 85, 84 and 83 connecting to leads 52, 40 and 32, respectively, appropriate connections are made to the gate of triac 50, one side of capacitor 58 and triac 50, and the opposite side of capacitor 58 and inductor 56, respectively.

By use of the ceramic strip 82 and soldering the leads 32, 40 and 52 to respective terminals 83, 84 and 85, most of the heat normally conducted out of the housing 68 via leads 32, 40 and 52 is transferred to the heat sink 74. By such a connection of the leads 32, 40 and 52 as just described, there is only a minor temperature rise (which closely follows the temperature rise of the heat sink 74) above ambient of the leads 32, 40 and 52 outside of the housing 72. This allows the remote unit 12 to pass all standard heat tests by Underwriters Laboratory with ease with the only limiting factor being the capacitor of the heat sink 74. Heat dissipation by the control unit 12 is negligible.

As a typical example of construction, the ceramic strip 82 may be 50/1000ths of an inch thick and the terminals 83, 84 and 85 may be tin plated steel of well-known configuration. Power lead 32 and load lead 40 would typically use No. 12 gauge wire with a large number of strands thereby permitting ease of soldering to the terminals 83 and 84 and good flexibility. The interconnecting lead 52 used for the gate of the triac 50 may be of a smaller gauge up to the minimum of 18 gauge allowed for household wiring, it still should have a large number of strands to allow ease of soldering to terminal 85. The particular design of the inductor 56 may vary, but applicants presently use a 12 gauge solid wire in forming the inductor 56. As typical values in the control unit 10, variable resistor 18 may be approximately 100 kilohms and resistor 46 may be approximately 8 kilohms.

By use of a light dimming switch comprising a control unit 10 and a remote unit 12 as previously described, and having physical structure in the remote unit 12 as shown and generally described in more detail in FIGS. 3 and 4, all known requirements for Underwriters Laboratory can be easily passed. Also, interference with AM broadcast bands is negligible.

The suppression of RFI noise for both the control unit 10 and the remote unit 12 will entail two basic forms of RFI noise. The first form of RFI noise is being conducted by the power lead 32, interconnecting leads 40 and 52 which act as transmission lines. The second form of RFI noise is energy radiated directly from leads or internal current loops as they are triggered with current going from zero to the load limited value in a few microseconds. A frequency analysis of the switching of the diac 44 and triac 50 gives essentially a step function of current with an infinite spectrum of energy and amplitude inversely proportional to frequency. Such a step function produces a continuous spectrum of noise with an amplitude which decreases with the frequency of switching at a rate of 20 db per decade. The control unit filter network 34 and the remote unit filter network 54 are designed to reduce the interference level below a maximum value of 500 quasi-peak microvolts. Radiation of RFI noise can be further reduced from the control unit 10 and remote unit 12 by using housings 68 and 70 formed from metal, or installing the housings 68 and 70 in metal switch boxes. Reducing the length of the leads 32, 52 and 40 between the control unit 10 and the remote unit 12 can also reduce radiation of RFI noise, as well as shielding.

By use of the invention as previously described, a light dimming switch can be provided with the control unit 10 being mounted in a switch box in a manner that appears the same as an ordinary snap switch. The remote unit 12 can be located at an inconspicuous position on the wall, inside the wall, or even in the attic, totally out of view. Some ventilation is normally necessary for the remote unit 12 for cooling. Also, the light dimming switch as previously described can be used in commercial establishments having much larger power demands to require higher wattage capabilities, yet where decorative appearance is very important. For example, in a restaurant where low level lighting during the evening hours is desirable, but maximum lighting during cleanup operations is necessary, the previously described light dimmer is ideal. Also, the present switch may be included in ganged switch boxes further adding to decorative appearance.

We claim:

1. A switch for varying current received by a load from a source of AC power, said switch including a control unit and a remote unit;

said control unit in a first housing comprising means for connecting said load and said source of AC power to a control circuit contained in a control housing of said control unit, said control circuit including first switching means for providing a gate signal during each half cycle of said source of AC power, a vertically actuated lever pivotally mounted in said control housing operating full ON and full OFF contacts at opposite end of pivotal movement thereof, said lever simultaneously with movement to position intermediate positions between said full ON and full OFF changing variable resistance means in said control circuit connected in series with said source of AC power and said load and to said first switch means to vary a trigger point of said first switching means, wiper means of said variable resistance means being position by said vertically actuated lever mounted in said control housing;

said remote unit in a second housing comprising second switching means mounted on a heat sink inside a second housing, said second housing being remotely located from said first housing, said remote unit having at least three leads connecting to said control circuit of said control unit, a first of said leads connecting said gate signal to a gate terminal of said second switching means, a second of said leads connecting said source of AC power to a first side of said second switching means, and a third of said leads connecting said load to a second side of said second switching means, said second switching means receiving said gate signal during each half cycle of said source of AC power to allow conduction of load current therethrough when not disconnected or bypassed by said contacts, heat from said second switching means being dissipated in said heat sink;

electrical connecting means for said leads comprising a thin, electrically insulating thermally conductive strip having one side secured to said heat sink and terminals positioned on a second side of said strip, said strip and said terminals being attached to said heat sink by screws, said screws being electrically insulated from said heat sink and connecting to said first, second and third leads;

said switch having a maximum rating of between 600 watts to 3000 watts for delivering to said load, first filter means in said second and third leads between said control unit and said remote unit wherein said remote unit switches current being delivered up to said maximum rating, said first filter means preventing RFI noise from interfering with normal AM broadcast bands;

said control unit including said first housing and electrical connections thereto being adapted to fit inside a standard switch box without extra heat sinks attached thereto.

2. The switch as recited in claim 1 comprising second filter means in said control unit connected between said first switching means and said source of AC power, said first filter means being located in said remote unit.

3. The switch as recited in claim 2 comprising shielding means along said leads to prevent RFI noise radiation, said control housing and said second housing being mounted in electrically conductive switch boxes.

4. The switch as recited in claim 1 wherein said first filter means is constructed from an LC circuit having a capacitor and inductor, said capacit having a range of 0.1 to 0.3 microfarads and said inductor having a range of 1 to 200 microhenries.

* * * * *